United States Patent [19]

Turner, Jr.

[11] Patent Number: 5,382,397
[45] Date of Patent: Jan. 17, 1995

[54] METHOD OF FORMING CLOSED CELL FOAM SEALS FOR AUTOMOTIVE BODY SEAMS

[75] Inventor: Herman E. Turner, Jr., Wellington, Ohio

[73] Assignee: Nordson Corporation, Westlake, Ohio

[21] Appl. No.: 27,557

[22] Filed: Mar. 5, 1993

Related U.S. Application Data

[63] Continuation of Ser. No. 175,330, Mar. 30, 1988, abandoned.

[51] Int. Cl.⁶ .............................................. B29C 67/22
[52] U.S. Cl. ................................... 264/46.5; 264/46.6; 264/50
[58] Field of Search ............... 264/36, 50, 46.5, 46.6; 156/78, 79

[56] References Cited

U.S. PATENT DOCUMENTS

| | | | |
|---|---|---|---|
| 3,075,802 | 1/1963 | Lowe | 296/29 |
| 3,151,427 | 10/1964 | Meissner et al. | 156/79 X |
| 3,242,239 | 3/1966 | Schafer | 264/36 |
| 3,310,613 | 3/1967 | Lundberg | 264/36 |
| 3,323,267 | 6/1967 | Fish | 264/46.5 X |
| 3,380,213 | 4/1968 | Hartman et al. | 264/36 X |
| 3,680,910 | 8/1972 | Stanner | 296/29 |
| 3,843,586 | 10/1974 | Wolf | 264/36 X |
| 4,057,443 | 11/1977 | Stiling et al. | 264/50 X |
| 4,059,714 | 11/1977 | Scholl et al. | |
| 4,259,402 | 3/1981 | Cobbs, Jr. et al. | |
| 4,297,154 | 10/1981 | Keller | 156/79 |
| 4,301,119 | 11/1981 | Cobbs, Jr. et al. | |
| 4,358,417 | 11/1982 | Beinhauer | 264/36 |
| 4,369,978 | 1/1983 | Watanabe | 428/57 X |
| 4,405,063 | 9/1983 | Wydro et al. | 222/195 |
| 4,526,636 | 7/1985 | Mader | 264/36 X |
| 4,555,284 | 11/1985 | Quella et al. | 156/79 |
| 4,597,461 | 7/1986 | Köchy et al. | 296/197 X |
| 4,679,710 | 7/1987 | Jameson et al. | 222/190 |
| 4,682,711 | 7/1987 | Reighard et al. | 222/75 |
| 4,693,772 | 9/1987 | Douglas | 264/46.5 |
| 4,719,689 | 1/1988 | Yamamoto et al. | 296/29 X |

FOREIGN PATENT DOCUMENTS

| | | | |
|---|---|---|---|
| 550139 | 10/1956 | Italy | 264/50 |
| 699655 | 11/1953 | United Kingdom | 264/50 |

OTHER PUBLICATIONS

General Motors Corporation Painted Products Specification No. 9982216 "Sealer-Low Bake, Non-Paintable, Sprayable" Jun. 19, 1985.

*Primary Examiner*—Allan R. Kuhns
*Attorney, Agent, or Firm*—Wood, Herron & Evans

[57] ABSTRACT

Method and apparatus are disclosed for sealing automotive body seams by forming directly in place a closed cell foam structure with a multitude of fine cells containing gas thereby sealing the body against moisture, dust and noise intrusion.

12 Claims, 3 Drawing Sheets

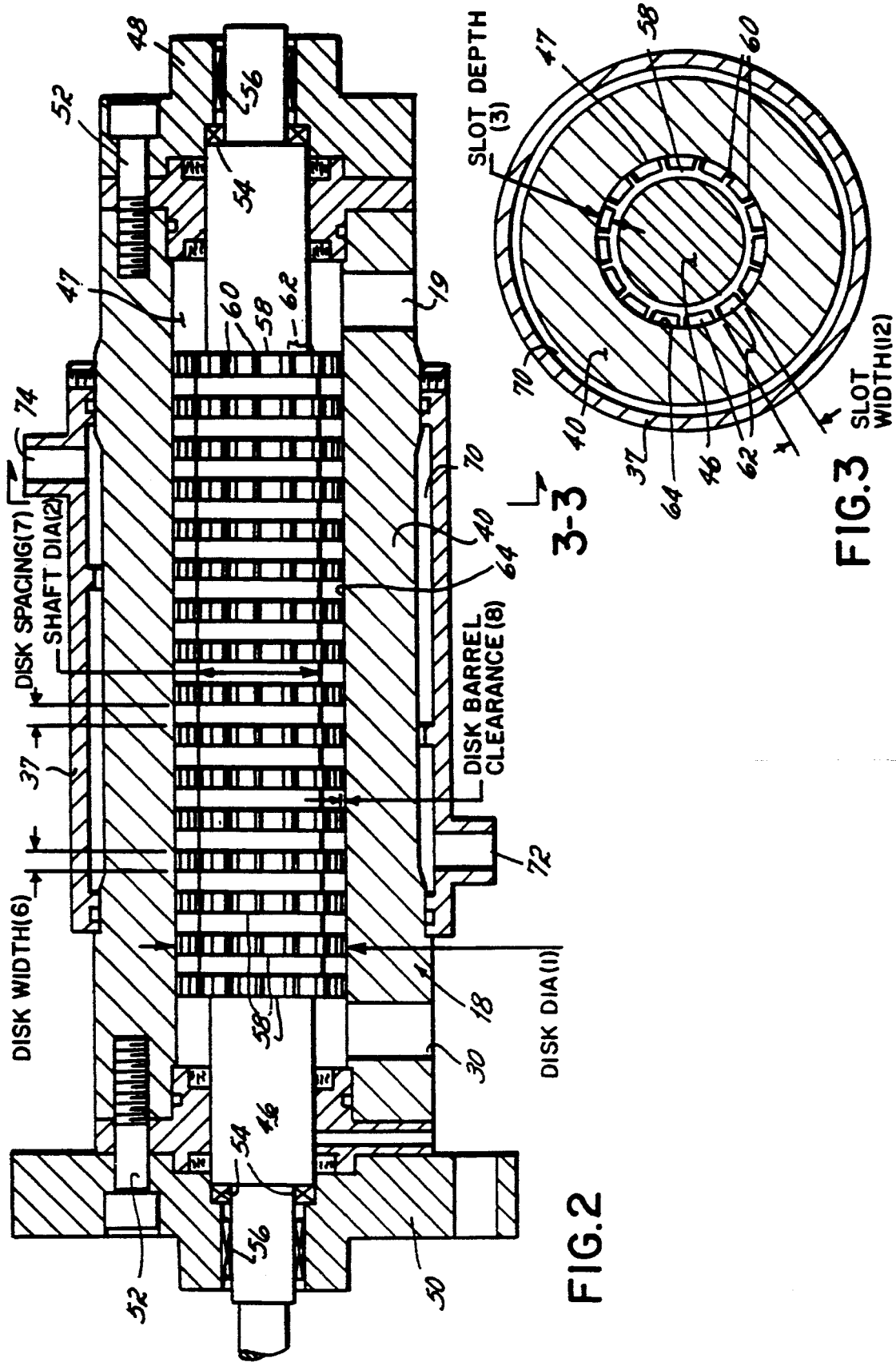

METHOD OF FORMING CLOSED CELL FOAM SEALS FOR AUTOMOTIVE BODY SEAMS

This application is a continuation of application Ser. No. 175,330, filed Mar. 30, 1988, now abandoned.

BACKGROUND OF THE INVENTION

Body joints or seams of automobiles are currently being sealed by polymeric sealing compositions, usually a vinyl plastisol or epoxy. Nearly every welded seam of an automobile body dictates that the seam be covered with a sealant either before or after the body is primed and painted. These seals are critical because they protect the passenger compartment from moisture, dust and wind or road noise. Seals also prevent leakage and combat corrosion problems. Imperfect of seals lead to quality problems and costly warranty repairs for the manufacturer.

Current commercial seam sealant systems provide beads of sealant material that are applied to completely cover a welded seam or joint in sufficient quantity without marring the appearance of the finished product and contaminating subsequent finishing operations. Recent innovations have provided improved methods and apparatus for applying sealant to a welded seam of an automobile to effectively cover that seam without the use of excessive sealant material. U.S. Pat. No. 4,682,711 has issued to the assignee of this application and is directed to such improved methods and apparatus.

Further improvements are being sought in automotive body sealant methods and apparatus. Seam sealant cost savings, reduced material usage, better seam filling properties, greater adhesive strengths and enhanced seam penetration are also objectives of such efforts.

SUMMARY OF THE INVENTION

This invention is directed to a method and apparatus for applying a closed cell foam seal to an automotive body seam. Unique automotive body seal constructions are also provided. The method includes supplying a controlled amount of a liquid sealant closed cell foam into the automotive body seam or joint so that the seal is formed in place without spitting or sputtering. A multitude of fine closed cells containing gas are rather uniformly created in place as the sealant material is foaming.

A number of advantages are secured according to the principles of this invention. Considerable reduction in quantity of sealant materials is achieved utilizing the method and apparatus of this invention without sacrificing sealant effectiveness. Weight reduction by at least several pounds of sealant per vehicle may be achieved. Such weight reduction also directly impacts on savings in gas mileage. Reduction in material usage also produces cost savings and it is estimated that at least several dollars can be saved per car. Better seam filling properties are obtained with the closed cell foam seal construction because foaming in place allows for a slight expansion upon curing to penetrate and fill seams more effectively. Furthermore, curable plastisol or elastomeric seam compositions may be foamed and cured coincidentally with oven paint curing processes currently employed. Another advantage of the closed foam sealant construction is the ability to be surface painted because of its smooth outer surface. Viscosities of foamed polymeric sealants are lowered and hence greater seam penetration is obtained in the automotive seams.

The above benefits and other improvements over current techniques have been achieved by the method and apparatus of this invention contrary to established specifications of at least one major automotive manufacturers. More specifically, prior to this invention, specifications of automotive body sealers and resultant seals prohibited even the accidental inclusion of air in the seal. Air caused spitting and sputtering of sealant with resultant imperfect seams. Thus, efforts were made to prevent the formation of any openings or trapped air in the sealants for fear of producing imperfect and unacceptable seams. Such seam failure would open the passenger compartment to moisture, dust and wind noise. Also, seam quality problems attributable to the introduction of air or a discontinuous seal structure lead to costly warranty repairs. Thus, automotive manufacturers' written specifications required smooth continuous seals free of air or bubbles because such were detrimental to the ability to seal body joints against water, dust and air intrusion. Such detailed specifications also provided for sealant paintability, smooth surface characteristics, solids content, appearance, after-baking oven properties, corrosion resistance and other factors. Before this invention, such specifications centered upon the manufacturers' requirement that a sealant material and resulting seam must be a solid homogeneous mass. Against this background, therefore, contrary to all the requirements laid down by automotive manufacturers and contrary to the thinking of a person of ordinary skill in the art to which this invention pertains, this invention utilizes an automotive body seam seal having a closed cell foam containing gas that offers the overwhelming numerous advantages detailed above.

The method of this invention for sealing automotive body seams includes the step of metering a controlled amount of liquid sealant material from a bulk reservoir to the automotive body seam and forming in the seam a bead of sealant material having a closed cell foam structure with a multitude of fine cells containing gas. The fine foam cells are rather uniformly created in place in the seam or joint. The closed cell foam structure thereby seals the automotive body against moisture, dust and noise intrusion. Furthermore, in a preferred form, the closed cell foam structure is elastic or elastomeric, thereby more effectively sealing the seam and providing resistance to body vibration and insulation from road noise. Useful liquid sealant materials that may be foamed to provide a closed foam cell seal structure preferably include polymeric materials of a thermoplastic, thermosetting or plastisol polymeric nature. Furthermore, organosol liquid sealant compositions may be used. Vinyl plastisol or epoxy polymeric compositions are now widely employed in the automotive body industry to provide body seals. The vinyl plastisol sealers usually have a low temperature of fusion, non-flow and flexible nature for application over cathodic electrocoated metal surfaces. These known sealant materials, as stated above, have heretofore been specified to show no sign of trapped air from either an external observation or a sectional view before or after curing the autobody seal.

A preferred form of an apparatus useful for forming automotive body seams having a closed cell foam structure includes a pump in a processing line for the polymeric sealant material upstream of a separate low energy mixer for mixing gas in the sealant. The pump is adapted for force feeding the polymeric material from a liquid sealant material bulk reservoir through the low energy mixer. In the low energy mixer, a gas is introduced for solubilization in the polymeric sealant material and the gas is maintained in solution with the polymeric material in the low energy mixer for dispensing the polymer/gas solution near atmospheric pressure for forming the foamed seal. In another preferred embodiment, the apparatus includes means for metering the flow of the foam sealant material through a plurality of extrusion guns so as to maintain an even flow of the foam sealant material from the extrusion guns upon actuation of flow control valves irrespective of pressure changes which may occur in the foam sealant material contained in a distribution manifold that supplies the extrusion guns. With respect to such preferred metering means, reference is made to U.S. Pat. No. 4,682,711, issued to the assignee of this application, that discloses a system for dispensing viscous sealant materials to cover a welded seam without application of any excess material. The disclosure of this patent is incorporated herein by reference in its entirety. Furthermore, U.S. application Ser. No. 036,871, filed Apr. 9, 1987, now U.S. Pat. No. 4,778,631 assigned to the same assignee, is directed to a method and apparatus for foaming high viscosity polymer materials that may be used for foaming the closed cell automotive body seals of this invention. This application in its entirety is also incorporated herein by reference.

One preferred form of an apparatus for forming an automotive body foam seal of this invention includes a low energy disk mixer having a series of spaced disks on a rotating shaft within and extending along a housing containing the gas and polymeric sealant material under pressure. This low energy disk mixer includes a tubular housing and a driven shaft extending along the length of the housing having a series of spaced disks substantially perpendicularly to the axis thereof. The disks are toothed about their outer circumference to provide a profile of arcuately spaced teeth with slots therebetween. The teeth extend substantially to the inner wall of the housing whereby the spaced slots form with the fixed inner wall of the housing a series of circumferentially-spaced chambers between teeth. The chambers serve to divide the housing into a series of rotating compartments from disk to disk along its length. The polymer to be foamed and the foaming gas are introduced in liquid or gaseous form, respectively, at one end of the housing. A polymer/gas solution outlet extends from the other end of the housing. The shaft is driven causing the disks to rotate with rotation of the shaft. Rotation of the disks causes the breakup of gas bubbles in the polymer, shearing of the polymer material in the disk slots with respect to the fixed inner wall of the housing and providing a laminar flow of the polymeric material through the mixer to enhance dissolution of the gas in the polymer. The result of the mixing operation is that the polymeric sealant material is produced having a solution of gas therein. The polymer/gas solution may then be transferred out of the polymer/gas outlet under pressure to a dispensing device such as a nozzle or metering gun from which the material may then be dispensed at atmospheric pressure to form the automotive body seal having a closed cell foam structure.

BRIEF DESCRIPTION OF THE DRAWINGS

FIG. 2 is a cross-sectional view of the disk mixer used in the practice of the method of this invention taken along the longitudinal axis of the shaft;

FIG. 3 is a cross-sectional view taken along line 3—3 of FIG. 2; and

DETAILED DESCRIPTION

Figure 1:
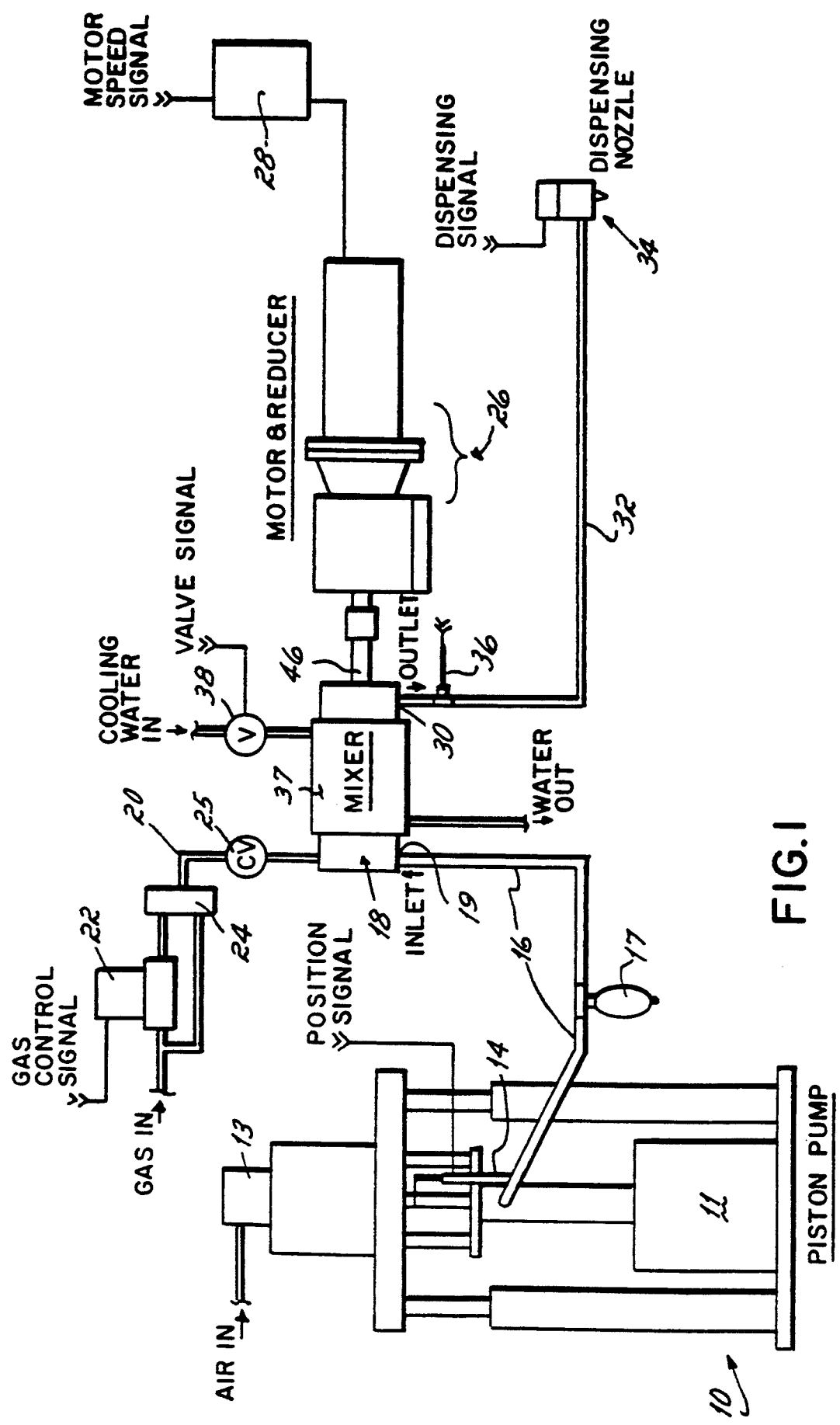
FIG. 1 is a schematic of a system for performing the method of this invention.

Liquid sealant compositions that may be dispensed according to this invention include polymeric components as stated above of a thermoplastic, thermosetting, plastisol or organosol nature.

A "thermoplastic material", as that term is used and understood to those skilled in the art, includes any natural or synthetic thermoplastic polymer or polymeric composition. A thermoplastic material is a normally solid or semi-solid material at use temperatures and it melts or liquifies upon heating to a higher temperature. Upon cooling, the material solidifies or returns to a solid or semi-solid state. As also used in this description, the term "thermoplastic hot melt adhesive" or "hot melt adhesive" is a term which is well known in the art and this material has the same characteristics of liquification upon heating and, upon cooling, solidification to a solid, semi-solid or tacky state.

A "thermosetting material," as that term is used and understood to those skilled in the art, includes any natural or synthetic thermosetting polymer or polymeric compositions. Thermosetting resins are often liquids at some stage of processing, which are cured by heat, catalyst or other chemical means. After being fully cured, thermosets are substantially infusible and insoluble and cannot be liquified by heat.

Examples of thermoplastic materials include polymers of ethylenically unsaturated monomers, such as polyethylene, polypropylene, polybutylenes, polystyrenes, poly α-methyl styrene), polyvinyl chloride, polyvinyl acetate, polymethyl methacrylate, polyethyl acrylate, polyacrylonitrile and the like; copolymers of ethylenically unsaturated monomers such as co-polymers of ethylene and propylene, ethylene and styrene, and polyvinyl acetate, styrene and maleic anhydride; styrene and methyl methacrylate; styrene and ethyl acrylate; styrene and acrylonitrile; methyl methacrylate and ethyl acrylate and the like; and polymers and copolymers of conjugated dienes such as polybutadiene, polyisoprene, and polychloroprene. Examples of thermosetting materials useful in this invention include synthetic butyl rubbers, synthetic isoprene rubbers, silicone RTV (room temperature vulcanizing) rubbers, styrenebutadiene rubber, ethylene-propylene-diene rubber, acrylonitrile-styrene-butadiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. These materials can have viscosities extending above 1,000,000 cps.

The term "thermoplastic material" is sometimes used herein interchangeably with "hot melt," "melt," "hot melt thermoplastic" or "hot melt adhesive." It is, of course, to be appreciated that all these compositions are characterized by their thermoplastic nature as above defined. Examples of thermoplastic or hot melt adhesive compositions having markedly different viscosities (as measured by the Brookfield viscometer) employed in the operating examples which follow are conventional polyethylene-based adhesive compositions. Another example of a thermoplastic material is a polyisobutylene-based thermoplastic sealing and caulking material sold by Tremco Company under the name Tremco Butyl Sealant JS-792. This material has a viscosity in the range of 740,000 cps at 375° F. and 970,000 cps at 350° F. An example of a thermosetting material is a relatively highly viscous polymer material, Dow Corning 732 RTV manufactured by Dow Corning Company, which is a thermosetting RTV silicone rubber.

Another class of liquid polymeric compositions which may be dispensed with apparatus of this invention includes plastisols or organosols. A plastisol is a suspension or dispersion of small particles of a polymeric substance in a liquid plasticizer for the polymeric substance. A plastisol contains no volatile thinners or diluents. Plastisols often contain stabilizers, fillers and pigments, but all ingredients have low volatility during processing and end use. As mentioned above, vinyl plastisols are widely used as autobody sealants presently and are fused by heating usually coincidentally with paint baking. Closely associated with plastisols are organosols. Organosols are dispersions extended with organic volatiles which are removed during fusion of the polymeric material. The most commonly useful polymeric substance for plastisols is polyvinyl chloride and its copolymers such as vinylacetate, acrylate and maleate. Further examples of plastisol systems include polyvinyl butyral, cellulose acetate butyrate, polyvinylidene fluoride, polymethyl methacrylate and others form the list of polymers described above. A reference on plastisol and organosol compositions in general, for inclusion herein, is "Plastisols and Organosols", edited by Herald A. Savetnick, Van Nostrand Reinhold Company, 1972 Library of Congress Catalog No. 75-151258, Chapter 6, pages 83–105.

In addition to the variability in polymer formulations, different types of gases may be employed in the practice of this invention including air, nitrogen, oxygen, carbon dioxide, methane, ethane, butane, propane, helium, argon, neon, fluorocarbons such as dichlorodifluoroethane and monochlorotrifluoromethane, or other gases, or mixtures of any of these gases. Such gases can be varied again according to the types of polymeric materials and other additives employed.

Referring now to FIG. 1 of the drawings, a schematic illustration of a system for performing the method of this invention is shown. This apparatus employs a pump 10 capable of delivering the polymeric material from a bulk source such as a bucket or barrel 11 at a metered rate from about 10 to 1,000 pounds per hour at a pressure normally in the range of 500 to 1,200 psig but of up to 5,000 psig without doing an undue amount of work on the polymeric material thus avoiding raising the polymer temperature. A suitable pump is a double acting piston pump driven by an air motor 13, such as a Johnstone pump. However, any pump capable of providing sufficient pressure to pump the material from the bulk container 11 is suitable. The pump 10 is fitted with a device such as a linear potentiometer 14 to generate a signal proportional to polymer flow rate.

The material to be foamed is conveyed through line 16, which may be a hose capable of conveying liquid material under pressure, through an accumulator 17 to the upstream or inlet end 19 of a disk mixer 18 where it is injected into the mixer.

The foaming gas is supplied to the disk mixer 18 from a pressurized gas supply through a gas line 20. A gas metering valve 22 and a differential pressure valve 24 in line 20 permit control of gas pressure and flow rate to the mixer 18 independent of system pressure and proportional to polymer flow rate. A suitable valve 22 is a Model 5850E Flow Controller manufactured by Brooks Instrument Division, Emerson Electric Co., Hatfield, Pa. The gas is supplied to the mixer 18 close to the polymer material inlet 119. A check valve 25 prevents flow of polymer material into line 20. The polymer and gas are introduced to the mixer 18 at an elevated pressure, e.g., 500 to 1,200 psig. The gas flow path 20 introduces gas bubbles into the mixer close to the line 16 supplying the polymeric material to the mixer 18 such that the gas and polymer enter the mixer together and completely fill it for placing the gas into solution in the polymer in the mixer.

Mixer 18 is driven by a motor and reducer 26 controlled by a standard motor controller 28. At the downstream end of the mixer 18 is an outlet 30 through which the polymer/gas solution passes out of the mixer through a line 32 to a dispensing nozzle 34. The temperature of the polymer/gas solution exiting the mixer is monitored by a thermocouple 36.

The temperature of the mixer may be controlled by circulating cooling water through a jacket 37 (FIG. 2) surrounding the mixer 18 as controlled by a valve 38 responsive to a valve input signal from the thermocouple 36. Generally, the materials described above are unaffected by a temperature rise of up to 20° F. and can withstand a 30° to 50° F. temperature rise. Coolant can be used to maintain these parameters.

Referring now to FIGS. 2 and 3, the construction of the disk mixer 18 is shown in detail. The mixer 18 comprises a tubular housing or barrel 40 which is supported on a mount by means of bolts (not shown). Extending along the long axis of the housing 40 is a shaft 46. Downstream and upstream end caps 48 and 50, respectively, are secured to the respective opposite ends of the housing 40 by suitable means such as bolts 52. The end caps 48 and 50 close the housing 40 ends and include suitable thrust bearings 54 and journals 56 for supporting the shaft 46 for rotation. Since the interior of housing 40 is under pressure and since some applications such as the foaming of hot melt adhesives takes place at elevated temperatures, e.g., 350° F. or higher, the seals must be able to withstand these elevated pressures and temperatures without leaking. Alternatively, small grooves can be placed in the shaft 46 to pump material back to chamber or center core 47.

As shown in FIG. 1, the shaft 46 is driven by an electric motor through a reducer 26. A constant rpm controller 28 can be used to control motor speed. In this specific embodiment, which is for purposes of illustration and not by way of limitation, the shaft 46 is machined to provide a series of spaced disks 58 which are substantially perpendicular to the axis of the shaft 46. As best seen in FIG. 3, the disks 58 have a series of spaced teeth 60 on the outer circumference separated by slots 62. Moreover, the teeth 60 extend substantially almost to the inner wall 64 of the housing 40 creating individual spaced compartments between the teeth 60, the slots 62, and the housing wall 64 while permitting rotation of the shaft and disks within the housing 40. Operation of the drive motor 26 causes rotation of the shaft 46 which in turn causes rotation of the spaced disks 58 and movement of the teeth 60 and slots 62 with respect to the fixed housing inner wall 64.

The polymeric material enters the housing 40 through a port 19 in the upstream end of the housing communicating with the center bore 47 of housing 40. Line 16 is connected to port 19 by a suitable fitting (not shown). The foaming gas delivered to the housing through line 20 enters through an opening (not shown) in the housing wall close to port 19. Line 20 is connected to the opening by a suitable pressurized hose fitting.

A material outlet port 30 extends through the housing wall 40 at the downstream end of the housing. The port 30 is connected with line 32 and permits the polymer material having gas mixed in solution and being under pressure in the housing 40 to exit the mixer 18 and be conveyed to the dispensing nozzle 34.

The housing 40 may be cooled if desired, for example, by circulating cooling water through the space 70 between the jacket 37 and the outer wall of the housing 40. Ports 72, 74 may be provided for cooling water inlet and outlet, respectively. Alternatively, in sealant applications requiring heating of the polymeric material, e.g., in foaming hot melt adhesive seals, the jacket 37 may be removed and band heaters applied for heating the housing 40 to a desired temperature.

In operation of this embodiment of the invention, the gas and the polymeric material (e.g. vinyl plastisol) are introduced into the mixer 18 under a pressure in the range from about 500 to 1200 psi. The disks 58 are rotated at a speed of 50 to 200 rpm, preferably in the range of 100 to 200 rpm. As the gas comes into contact with the rotating disks, several phenomena occur. First, as the gas bubbles hit the the teeth 60, they are broken up into smaller bubbles. Second, as the gas and the polymer enter and pass through the slots 62 between the teeth 60, which form small chambers rotating with respect to the fixed inner wall 64 of the housing 40, the gas and polymer material are sheared. This action continues as the gas and polymer pass along the length of the housing. Third, as the gas/polymer mixture continually enters and exits subsequent downstream disks as it passes through the housing bore 47, it is cut, sheared, and twisted to provide a high interfacial area between the gas and the polymer. At the end of the mixer outlet 30, the gas is thoroughly mixed and in solution with the polymer.

Although the accompanying figures show the orientation of the mixer to be one where the shaft on which the disks are mounted is substantially horizontally disposed, that particular orientation is not critical. The mixer could be on a vertical axis with either the upstream or downstream end at the higher elevation or in any orientation therebetween since the polymer material fills the interior of the housing.

EXAMPLES

A disk mixer as shown in FIGS. 2 and 3 was employed to foam automotive body sealant compositions. The disk mixer was built of 41L40 steel. The length of the bore 47 was 8 inches, and the bore 47 had a radius of 1.008 inches. The housing had an external water jacket 37 permitting it to be cooled in the range of 30° to 70° F. Polymer material inlet temperatures were in the range of .65°–70° F. The shaft 46 extended through the barrel 40, as shown in FIG. 2 of the drawings. The shaft diameter (2) was 1.5 inches. The shaft 46 included sixteen steel disks 2.0 inches in diameter and 0.25 inch in disk width (6). The groove width (7) between disks was 0.25 inch and the groove depth (9) was also 0.25 inch. Each disk had 15 teeth and 15 slots Referring to FIG. 3, the slot depth (3) was 0.125 inch and the slot width (12) was 0.356 inch. The clearance (8) between the teeth 60 and the wall 64 was 0.008 inch. Fifteen percent of the disk circumference was comprised of the land area of the teeth 60.

The shaft was driven by an electric motor operated typically at about 0.25 horsepower. The shaft was typically rotated in the 100 to 200 rpm range. All materials were foamed with $N_2$ gas. The polymer material and gas were introduced into the mixer at a pressure in the range of 500 to 1000 psi. The material was delivered to a nozzle for dispensing which varied between 0.060 and 0.125 inch in internal diameter and 0.5 and 3 inches in length depending on the material and pressures involved.

Example I

Using the apparatus described immediately above, a white silicone RTV sealant sold by Stouffer-Wacker Silicone Co. under the designation 931 was foamed under the following conditions set out in Table I.

TABLE I

| | |
|---|---|
| Flow rate (g/min) | 87.5 |
| Power (hp) | .171 |
| Power (cal/min) | 1,800 |
| Torque (in-lb/) | 108 |
| Pressure Mixer Inlet (psig) | 688 |
| Pressure Mixer Outlet (psig) | 679 |
| Pressure loss (psig) | 9 |
| Pressure at Pump Outlet (psig) | 714 |
| Pressure at Gun Inlet (psig) | 583 |
| Sealant Temp. @ Mixer Inlet (°F.) | 69.6 |
| Sealant Temp. @ Mixer Outlet (°F.) | 68.8 |
| Temperature Rise (°F.) | −0.8* |
| Cooling Water @ Mixer Inlet (°F.) | 60.0 |
| Cooling Water @ Mixer Outlet (°F.) | 60.9 |
| Temperature Rise Coolant (°F.) | 0.9 |
| Approximate Water Flow (l/min) | 3.7 |
| Approx. Calories to Coolant (cal/min) | 1,870 |

*Due to cooling water.

Examples II–IX

Table II shows the results of foaming different commercially available polymers with the mixer shown in FIGS. 1–3. In each case the resulting product was a continuous, creamy, very homogenous foam with fine cells contained therein for forming the automotive body seam seals of this invention.

TABLE II

| | | Max. Density Reduction | Output (lbs/hr.) |
|---|---|---|---|
| II. | Dow Corning 732 RTV Silicone | 50% | 65 |
| III. | Tremco Spectrem 2 RTV Silicone | 57% | 65 |
| IV. | Tremco Proglaze RTV Silicone | 45% | 65 |
| V. | Stouffer-Wacker Silicone Co. 930 Series RTV Silicone | 60% | 65 |
| VI. | Essex Chemical Co. Polyurethane B390 | 70% | 65 |
| VII. | Allied Koch Materials Inc. Products 8040 or 8082 PVC Plastisol | 50% | 65 |
| VIII. | Ohio Sealer Corp. Product 2278 PVC Plastisol | 50% | 65 |
| IX. | Protective Treatments Inc. | 50% | 65 |

TABLE II-continued

| | Max. Density Reduction | Output (lbs/hr.) |
|---|---|---|
| Product E-642 PVC Plastisol | | 5 |

Figure 4A:
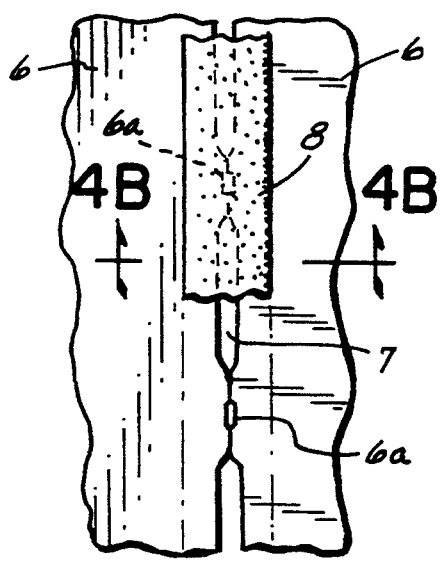
FIGS. 4 A–D illustrate the types of automotive body seams or joints that may be sealed using the method and apparatus of this invention; and illustrating the closed cell foam structure.
Figure 4B:
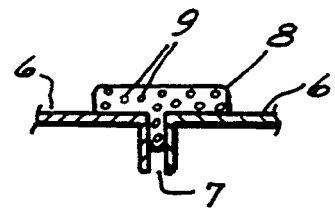
Figure 4C:
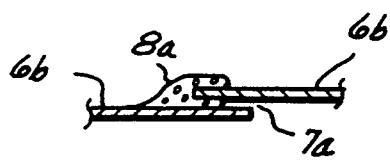
Figure 4D:
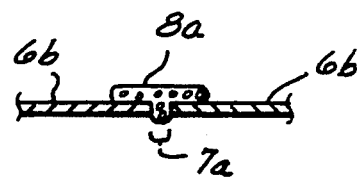

The foams produced by the method and apparatus above described may be injected or foamed in place to seal the seams and/or cracks in an automotive body and, as used herein, and in the claims the term "seam" is meant to cover all such body openings. With reference to FIGS. 4A–D, types of automotive body joints are shown. FIG. 4A shows a partial plan view of metal body sheets 6 spot welded together leaving gaps 7 in between the welds 6a. The gaps 7 need to be sealed at 8 to keep out dust, moisture and noise. FIG. 4B is a cross-sectional view of a gap 7 and the foam seal 8 representative of a coach joint with only a small number of actual closed cells containing gas represented in magnified form at 9. FIGS. 4C–D are similar to 4B except they are modified profiles of a lap joint and a butt joint, respectively, with the closed cell foam seals 8a shown in each gap 7a for metal body sheets 6b. Utilizing the system and apparatus shown in FIGS. 1–3, viscous foam sealant materials are dispensed onto welded seams or joints of the types shown in FIGS. 4A–D of an automobile. In a most preferred form, as mentioned above, the system of U.S. Pat. No. 4,682,711 is used for dispensing the viscous sealant material from the mixer of FIGS. 2–3. The system of the mentioned U.S. Pat. No. 4,682,711 is not shown, but detailed reference may be had thereto and, as stated above, such disclosure is incorporated herein by reference because this system allows uniform application of material resulting in the greatest material savings over other types of application methods. Of course, other methods of application may be employed; for instance, by manual means or by robots with extrusion guns. In addition, the foam sealant can be applied manually with extrusion guns. As developed above, plastisol compositions are currently widely employed, but not foamed for sealing seams. Using the method and apparatus described above, vinyl plastisols may be formed into closed cell foam seams for automotive body joints.

As a bead is extruded in place into the seam or joint from a dispensed solution, it foams. The bead is controlled to the desired width and amount for filling the seam. Foaming takes place by expansion of the gas ($N_2$) from solution. Gas is trapped in the matrix of the polymer to provide a fine closed cell structure and the foam expands to fill the seam. Where the foaming composition is a vinyl plastisol or elastomer, the foam is flexible or elastomeric.

A number of advantages are secured. Considerable reduction in quantity of sealant materials is achieved without sacrificing sealant effectiveness. Weight reduction and reduction in material usage by foams having 50% by volume cell structure also produces cost savings. Better seam filling properties are obtained with the closed cell foam seal construction because foaming in place allows for a slight expansion to fill seams more effectively. Furthermore, curable plastisol or elastomeric seam compositions may be foamed and foam curing with expansion to fill seams can be achieved coincidentally with oven paint curing processes currently employed. Viscosities of foamed polymeric sealants are lowered and hence greater seam penetration is obtained in the automotive joints.

Having described this invention, its various parameters and best mode of operation, other modifications will become apparent to a person of skill in this art, and such are within the scope hereof.

What is claimed is:

1. A method of sealing automotive body seams comprising
    supplying a controlled amount of foamable liquid polymeric sealant material from a bulk reservoir through a mixer for mixing said sealant material with a gas to a dispensing nozzle, said mixer having a housing with an inlet for receiving said polymeric material and an outlet for dispensing said polymeric material,
    introducing said gas under pressure into said mixer for solubilization in said polymeric material,
    providing a laminar flow of said polymeric material through said mixer to increase dissolution of said gas into said polymeric material to form a polymer/gas solution under pressure,
    maintaining said gas in solution with said polymeric material in said mixer,
    dispensing the polymer/gas solution downstream of said mixer outlet with a low pressure drop across said mixer inlet to said outlet thereby avoiding premature foaming of said polymeric material in said mixer whereby said gas is released at atmospheric pressure from solution forming a polymer sealant foam,
    forming directly in place a bead of said polymer sealant foam from said nozzle into an automobile body seam,
    controlling said bead to a desired width and amount as the foam expands to fill the seam,
    and curing said polymer sealant foam thereby providing in said seam a seal having a closed cell foam structure with a multitude of fine cells containing gas, thereby sealing said automotive body against moisture, dust and noise intrusion.

2. The method of claim 1 wherein said sealant material is a polymeric composition selected from the group consisting of thermoplastic polymers, thermosetting polymers, plastisol polymers and organosol polymers.

3. The method of claim 2 wherein said polymeric material is foamed under the action of heat.

4. The method of claim 2 wherein said polymeric material is foamed at ambient temperatures.

5. The method of claim 1 wherein said sealant material is a plastisol composition, said forming of foam in place is conducted at ambient temperature, followed by curing at a higher temperature thereby providing said seal.

6. The method of claim 5 wherein said foam is formed employing a gas selected from the group consisting of nitrogen, air, fluorocarbon gas and carbon dioxide.

7. The method of claim 1 which comprises the further steps of
    providing a pump in a processing line for said liquid sealant material upstream of said mixer which comprises a separate low energy mixer, said pump adapted for force feeding said polymeric sealant material from the bulk reservoir through said mixer, said mixer having a series of rotatable spaced disks in said mixer housing for mixing said polymer material with said gas, and
    force feeding said polymeric material by the action of said pump into and through said mixer along said series of disks.

8. The method of claim 1 including curing said polymeric sealant material to an elastomeric foamed state thereby providing a resilient seal in said seam.

9. The method of claim 8 comprising painting said body and curing said sealant material in an oven during curing of said painted body.

10. The method of claim 1 wherein said sealant material is a plastisol.

11. The method of claim 1 wherein said foam has a 50% by volume cell structure.

12. The method of claim 1 comprising the further step of expanding said foam upon curing to fill and penetrate said seam.

* * * * *